US005460303A

United States Patent [19]
Downs

[11] Patent Number: 5,460,303
[45] Date of Patent: Oct. 24, 1995

[54] BICYCLE BAG STABILIZER

[75] Inventor: Robert M. Downs, Madison, Wis.

[73] Assignee: Trek Bicycle, Corp., Waterloo, Wis.

[21] Appl. No.: 287,787

[22] Filed: Aug. 9, 1994

[51] Int. Cl.⁶ .................. B62J 7/00; B62J 9/00; B62J 11/00
[52] U.S. Cl. ............ 224/33 R; 224/32 R; 224/275; 248/207
[58] Field of Search ............... 224/32 R, 33 R, 224/39; 383/72, 74, 75, 76; 297/195.1, 214; 248/95, 207, 229; 280/288.4, 304.5; 190/118; 150/118

[56] References Cited

U.S. PATENT DOCUMENTS

| | | |
|---|---|---|
| 594,683 | 11/1897 | Duck . |
| 627,225 | 6/1899 | Eifler . |
| 1,661,188 | 3/1928 | Mathews . |
| 3,194,405 | 7/1965 | Hawie ............ 211/89 |
| 3,278,149 | 10/1966 | Brucker ............ 248/239 |
| 3,904,162 | 9/1975 | O'3 Konski ............ 248/27 |
| 4,178,656 | 12/1979 | MacFarlane ............ 16/93 D |
| 4,566,617 | 1/1986 | Jackson ............ 224/275 |
| 4,643,343 | 2/1987 | Goldman et al. ............ 224/32 R |
| 4,730,758 | 3/1988 | McMurtrey ............ 224/36 |
| 5,190,345 | 3/1993 | Lin ............ 224/39 |

FOREIGN PATENT DOCUMENTS 0448315  6/1936  United Kingdom ............ 224/32 R

OTHER PUBLICATIONS

Cannondale Mountain Bag: Copy of packaging prior to Jan. 30, 1992.
Selle San Marco Bicycle Seat: Four (4) photographs of seat.

Primary Examiner—Henry J. Recla
Assistant Examiner—Timothy L. Maust
Attorney, Agent, or Firm—David C. Brezina; Lee, Mann, Smith, McWilliams, Sweeney & Ohlson

[57] ABSTRACT

A bag stabilizer for a bicycle pack having two elongated material strips, two hooks and a fastener. The elongated material strips are connected to the top part of the pack extending through two hooks and out the bottom part into and through a fastener. The bag stabilizer prevents movement of the bag and its contents, particularly while the bicycle is in motion.

10 Claims, 2 Drawing Sheets

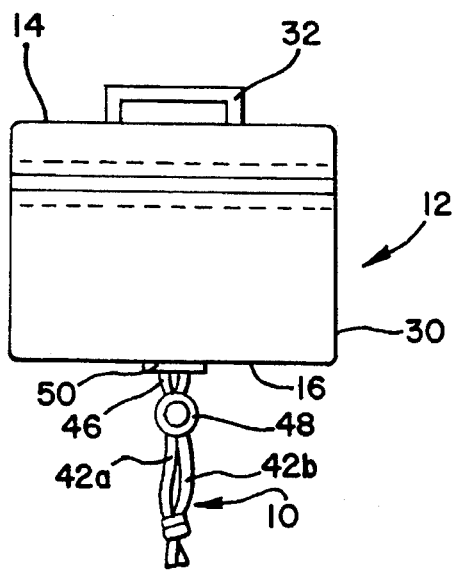
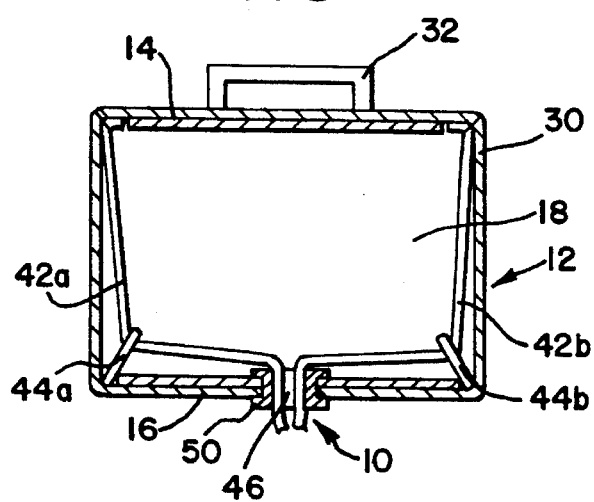
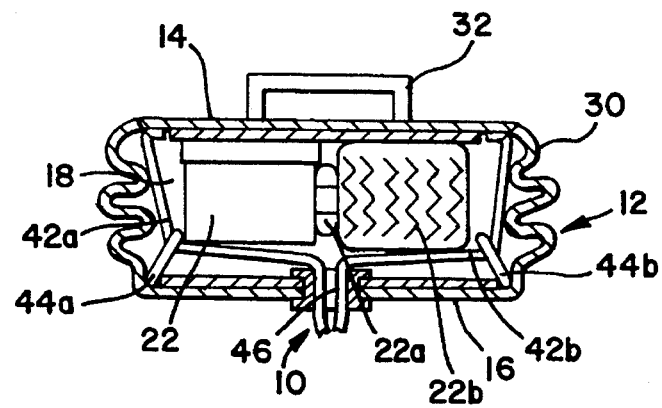

BICYCLE BAG STABILIZER

BACKGROUND OF THE INVENTION

1. Field of Invention

This invention is generally related to bags and accessory packs adapted to be carried on a bicycle, and specifically related to a stabilizer for the packs and goods contained therein.

2. Description of the Prior Art

There are many ways to carry goods on a bicycle. Old in the art is the open basket depicted for example in U.S. Pat. No. 4,730,758. The open basket attaches easily to the bike and has the ability to tote items of various shapes and sizes. However, it has no means of holding down, or stabilizing items carried within the basket. Moreover, as bicycle styles and constructions have changed, the open basket has become no longer practical. In fact, with the advent of road and mountain bikes, the open basket has under many circumstances become entirely unsuitable.

A closable type of bag otherwise known as a bicycle or accessory pack is now commonly employed. These packs are typically attached to the handlebars or behind the seat. A significant problem with the bicycle pack is its tendency to move, shift, and disorientate, from its own weight and exterior forces such as wind or bumps in the road. This movement creates an annoying noise to the rider, unnecessary wear and tear on the bag, and puts the contents of the bag in disarray.

There have been many attempts to solve this problem. For example, U.S. Pat. No. 4,566,617 depicts a seat assembly that fits underneath the seat of a bike. This seat assembly is designed to provide a firm means of securing the pack to the underside of the seat. However, the assembly has a complicated structure which includes a pack frame with finger portions, an underseat bracket and a seat attachment assembly, all in order to rigidly support the pack and its contents.

Other bicycle packs have been designed more simply, yet are less effective in stabilizing the goods. For example, some bags have utilized strips of VELCRO hook and loop material that connect the top part of the bag to the bottom part in order to tighten the bag. Although firmly holding the bag, these exterior strips may be damaged from the elements such as rain, and/or other harsh or heavy usage. Hence, losing their small range of effectiveness and capacity to support and stabilize the bag.

A need exists for a device which will stabilize a bicycle pack and is not complicated, having performance not subject to exterior wear and tear.

SUMMARY OF THE INVENTION

The present invention is a bag stabilizer for a bicycle pack that attaches to a bicycle. A typical bicycle pack will have at least one interior compartment, a top part for mounting the pack to the bicycle and a bottom part positioned opposite the top part.

The preferred bag stabilizer of the subject invention comprises two elongated material segments attached to the top of the pack within the interior compartment of the bag, two hooks preferably in the form of loops disposed within the interior compartment of the pack and connected to the bottom of the pack, and a fastener externally positioned in a spaced relationship to the bottom of the pack for receiving and tightening the elongated material strips. Each one of the material strips extends through one hook, through the bottom part of the pack, and into and through the fastener. Therefore, when the elongated material strips are drawn through the pack and tightened, the size of the interior compartment is effectively reduced, the bag securely is held together and the contents and the bag restricted from movement.

The present invention is efficient to manufacture, simple to construct and provides a very economical way of stabilizing the bike pack while holding its contents in place. The bag stabilizer may be incorporated into a wide variety of cargo or tote bags at a minimal manufacturing cost. The bag stabilizer of the present invention may be embodied into an accessory pack, with manual labor if necessary, and without the need for additional capital equipment. Additional materials necessary are two properly sized elongated material strips, two hooks which may be made of the strap material in the form of a loop, and a fastener. To prevent tearing and for additional strength, a grommet may be added at the aperture within the bottom part of the bag.

It is an object and feature of the present invention to provide a bag stabilizer that is easy to manufacture, cost effective, simple to use and durable.

It is a further object of the present invention to provide a bag stabilizer that is easily adapted to a wide variety of bicycle accessory packs or tote bags.

These and other objects and features of the invention will be readily apparent from the accompanying drawings and detailed description of the preferred embodiment.

DESCRIPTION OF THE DRAWINGS

The invention is described in greater detail in the following detailed description of the preferred embodiment providing the best mode of the invention, taken in conjunction with the drawing figures in which:

FIG. 4 is a back view of a bicycle pack showing the external parts of the stabilizer.

FIG. 5 is a cross sectional back view of the bicycle pack highlighting the details of the preferred embodiment of the stabilizer.

FIG. 6 is a cross sectional back view of a bicycle pack in a stabilized position with carried items.

DETAILED DESCRIPTION OF THE PREFERRED EMBODIMENT

Figure 1:
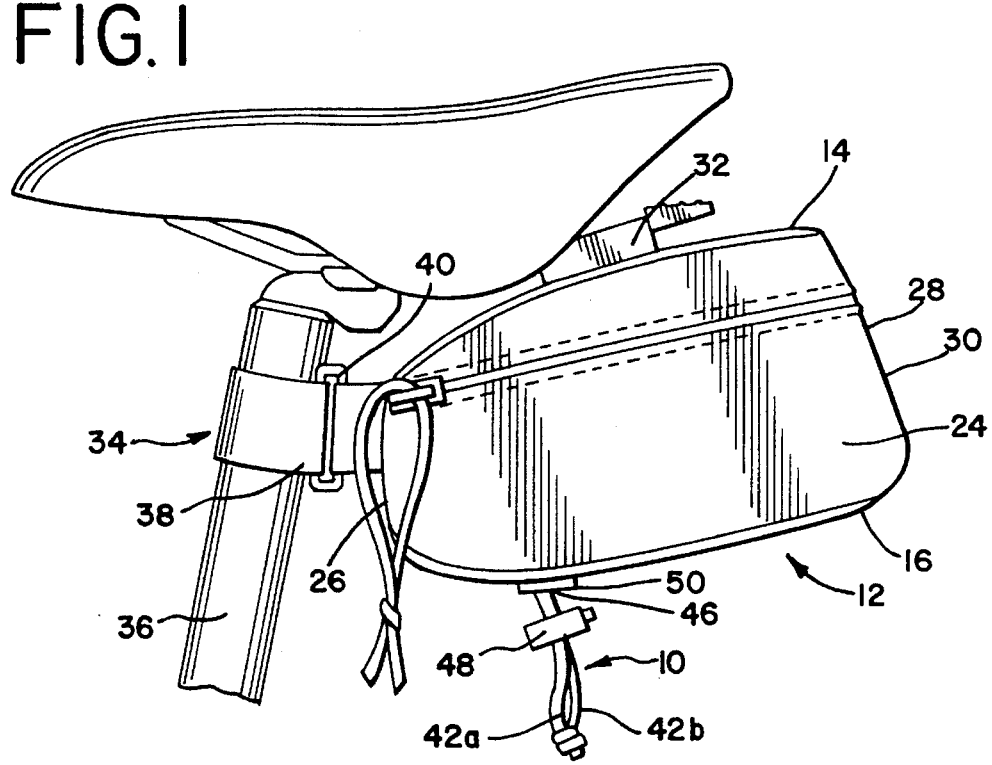
FIG. 1 is a side view of a bicycle pack containing the preferred embodiment of the stabilizer of the present invention.
Figure 2:
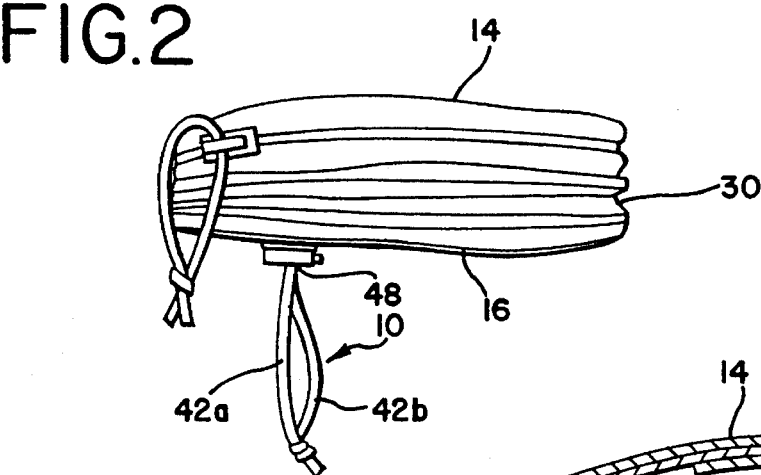
FIG. 2 is a side view of a bicycle pack showing the pack in a constricted or stabilized position.
Figure 3:
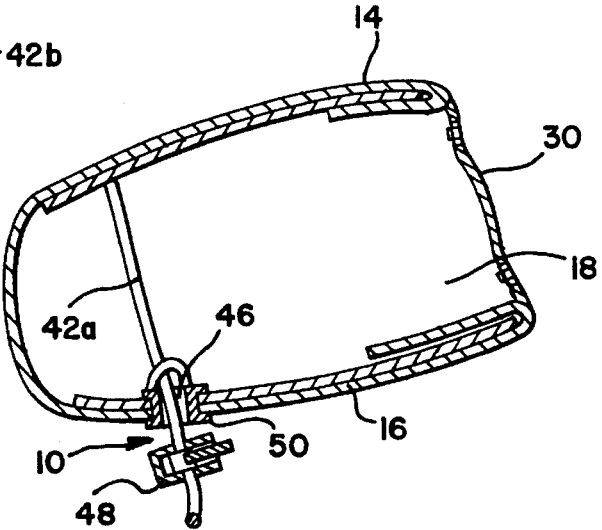
FIG. 3 is a cross sectional side view of a bicycle pack showing the details of the preferred embodiment of the stabilizer within the interior compartment.

FIGS. 1 through 6 represent the preferred embodiment of the present invention designated generally as the bag stabilizer 10 for a bicycle pack 12. As shown in the Figures, a typical bicycle pack 12 will have a cargo bag 30 comprising a top part 14 for mounting the pack 12 to the bicycle 20, a bottom part 16 positioned opposite the top part 14 and an interior compartment 18 for containing carried items 22, 22a, 22b. The top part 14 and the bottom part 16 of the bag 30 may be integrally connected or may be connected by a side part 24, or combination of both. In other words, as shown in FIG. 1, at one end 26 of the bag 30, the top 14 and bottom 16 parts may be integrally connected while at another end 28, they are connected by a side part 24. However, for the present invention to be operable, the cargo bag 30 need only have a top part 14, a bottom part 16 and interior compartment 18 which is closable for containing carried items 22 within the cargo bag 30.

A suitable bicycle pack 12 for the present invention also preferably includes at least one of a variety of different mounts connected to the bag 30. In the preferred embodiment of the present invention and as shown in the figures, the mount 32 is connected to the top part 14 of the bag 30. However, the mount 32 may be connected to a bottom part 16, side part 24 or any one or more of the parts 14, 16, 24. Furthermore, it is possible the stabilizer 10 of the present function both as the stabilizer 10 and as the mount 32. Mount 32 shown in the drawings is disclosed in a copending application Ser. No. 08/218,572 assigned to the assignee of this application.

The bicycle pack 12 may contain other items such as a seat post attachment 34. A seat post attachment 34 is typically designed to attach the bag 30 to the seat post 36 of the bicycle 20 and also helps to prevent bag movement and stabilize. FIG. 1 clearly depicts one common type of seat post attachment 34 comprising a strip of material 38 which is sewn to the bag 30 at one end and a buckle 40 for receiving and securing the strip of material 38 at its other end. Other types of seat post attachments include a VELCRO hook and loop type of attachment (not shown) where two strips of material are connected to the bag at one end and attach to one another with VELCRO material at the other.

Also, the bicycle pack 12 may contain one or more inner pockets (not shown). Often inner pockets have closure devices (not shown) to keep small articles such as keys and coins from shifting around in the bag 30.

Hence, the present invention is a stabilizer 10 for a bicycle pack 12. In the preferred embodiment, the stabilizer 10 comprises two elongated material strips 42a, 42b attached to the top part 14 of the pack 12 within the interior compartment 18 of the bag 30. Two hooks 44a, 44b are positioned within the interior compartment 18 and preferably are attached to the bottom part 16 of the bag 30. Each one of the elongated material strips 42a, 42b are extended through one hook 44a, 44b preferably on the same side of the interior compartment 18. However, it is possible to criss-cross the elongated material strips 42a, 42b and have the stabilizer 10 still be operable.

Upon extending through the hook 44a, 44b, each strap 42a, 42b is extended through an opening 46 in the bottom part 16 of the bag 30. The material strips 42a, 42b may extend through one opening 46 as shown in the Figures, or may extend through separate openings (not shown). Preferably, a grommet 50 is placed over the opening 46 to prevent tearing of and add strength to the material of the bottom part 16 of the bag 30. A fastener 48 is externally positioned in a spaced relationship to the bottom part 16 for receiving and tightening the material strips 42a, 42b. Therefore, each strip 42a, 42b extends through the hook 44a, 44b and out through the bottom part 16 of the pack 12 and through the fastener 48.

In operation, as the strip 42a, 42b are drawn through the bag 30 and tightened, the size of the interior compartment 18 is reduced, and the pack 12 securely is held together, stabilized and constricted from movement. The stabilizer 10 of the present invention may be installed by sewing either manually or by machine the elongated material strips 42a, 42b and the hooks 44a, 44b within the interior compartment 18 and extending the elongated material strips 42a, 42b in the appropriate manner described above.

Any one of a number of common fasteners may be used to secure the elongated material strips 42a, 42b externally from the pack 12. A preferable fastener 48 is shown in the figures and allows for the strings 42a, 42b to extend through the fastener 48 as the fastener is compressed. When released the fastener 48 closes (not shown) and secures the strips 42a, 42b in place. Other suitable fasteners include but are not limited to a cleat or a knot placed within the elongated material strips which prevent the strips from moving.

The elongated material strips 42a, 42b may be made of a wide variety of materials such as but not limited to nylon, polyester, polypropylene, cotton, or other synthetic or non synthetic materials, fibrous or non fibrous, or a combination therefore. The material strips 42a, 42b are preferably in the form of strings, straps, twine or rope type of material. The hooks 44a, 44b are preferably loops of the same material as the elongated material strips 42a, 42b. However, the hooks 44a, 44b may be made of different materials and in different shapes including molded materials including but not limited to both plastics and metals.

While the invention has been described in conjunction with a specific embodiment, it is evident that many alternatives, modifications and variations will be apparent to those skilled in the art in light of the foregoing description. Accordingly, the present invention is intended to embrace all such alternatives, within the scope of the claims. It will be evident that various changes be made to the invention without departing from, the spirit thereof or scope of the following claims.

I claim:

1. A stabilizer for a bicycle pack that attaches to a bicycle, the bicycle pack comprising a bag having an interior compartment, a top part and a bottom part positioned opposite the top part, and the stabilizer comprising:

two elongated material strips; two hooks adapted to be disposed within the interior compartment of the bag; and a fastener externally positioned in spaced relation to the bottom part, each said strip having a first and a second end, each said first end adapted to be attached to the top part of the pack within the interior compartment, each said second end extending through one said hook and through the bottom part of the pack whereby said strips are tightened and secured by said fastener to stabilize the pack while attached to the bicycle.

2. The stabilizer of claim 1 further comprising a seat post attachment externally connected to the pack.

3. The stabilizer of claim 1 wherein said material strips are strings.

4. The stabilizer of claim 1 wherein said hooks are in the form of loops.

5. The stabilizer of claim 2 wherein the seat post attachment comprises a VELCRO hook and loop device.

6. A bicycle pack for a bicycle comprising:

a cargo bag;

a bag stabilizer being in operable relation and connected to said bag; and a mount connected to said bag;

said cargo bag comprises a top part, a bottom part oppositely positioned to said top part and an interior compartment, said bottom part having an aperture for receiving said bag stabilizer, said mount connected to said top part of said bag for mounting said bag to the bicycle; and wherein said stabilizer comprises two elongated material strips; two hooks disposed within the interior compartment of the bicycle pack; and a fastener externally positioned in spaced relation to the bottom part of the bag, each said strip having a first and a second end, each said first end attached to the top part of the bag within the interior of the compartment, each said second end extending through one said hook and through the bottom part of the bag whereby said strings are tightened and secured by said fastener to stabilize the pack.

7. The bicycle pack of claim 6 wherein said bicycle pack is a seat pack for mounting behind the seat of the bicycle.

8. The bicycle pack of claim 6 wherein said stabilizer further comprises a seat post attachment externally connected to the pack.

9. The bicycle pack of claim 6 further comprises a pocket positioned within said interior compartment of said bag for holding small items.

10. The bicycle pack of claim 9 wherein said pocket further comprises a closure device.

\* \* \* \* \*